United States Patent
Miyahara

(10) Patent No.: US 11,256,929 B2
(45) Date of Patent: Feb. 22, 2022

(54) IMAGE-BASED ROAD CONE RECOGNITION METHOD AND APPARATUS, STORAGE MEDIUM, AND VEHICLE

(71) Applicant: Great Wall Motor Company Limited, Baoding (CN)

(72) Inventor: Shunji Miyahara, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 16/966,360

(22) PCT Filed: Jan. 30, 2019

(86) PCT No.: PCT/CN2019/073875
§ 371 (c)(1),
(2) Date: Jul. 30, 2020

(87) PCT Pub. No.: WO2019/149213
PCT Pub. Date: Aug. 8, 2019

(65) Prior Publication Data
US 2020/0372264 A1    Nov. 26, 2020

(30) Foreign Application Priority Data
Jan. 30, 2018 (CN) .......................... 201810092026.1

(51) Int. Cl.
*G06K 9/00* (2006.01)
*G06T 7/155* (2017.01)
*G06K 9/46* (2006.01)

(52) U.S. Cl.
CPC ..... *G06K 9/00798* (2013.01); *G06K 9/00818* (2013.01); *G06K 9/4633* (2013.01); *G06T 7/155* (2017.01); *G06T 2207/30256* (2013.01)

(58) Field of Classification Search
CPC ........... G06K 9/00798; G06K 9/00818; G06K 9/4633; G06K 9/00791; G06K 9/4604; G06T 7/155; G06T 2207/30256
See application file for complete search history.

(56) References Cited

U.S. PATENT DOCUMENTS

| | | | |
|---|---|---|---|
| 2006/0182313 A1* | 8/2006 | Miyahara | G06K 9/3241 382/104 |
| 2007/0031008 A1* | 2/2007 | Miyahara | G06T 7/70 382/106 |

(Continued)

FOREIGN PATENT DOCUMENTS

| | | |
|---|---|---|
| CN | 103020626 A | 4/2013 |
| CN | 103123687 A | 5/2013 |

(Continued)

OTHER PUBLICATIONS

Chen, S., et al., "Detection of obstacles' edges based on sobel-hough algorithm by parking assist system," Machinery Design & Manufacture, No. 2, Feb. 28, 2011, pp. 149-151.

(Continued)

*Primary Examiner* — Carol Wang
(74) *Attorney, Agent, or Firm* — Volpe Koenig

(57) ABSTRACT

An image-based road cone recognition method, apparatus, storage medium, and vehicle. Said method comprises: acquiring, during vehicle driving, an image of an object to be recognized; performing differential processing of the image, so as to acquire an image on which the differential processing has been performed, and performing, according to a preset threshold, ternary processing of the image on which the differential processing has been performed, so as to acquire a ternary image comprising forward boundary pixels and negative boundary pixels; acquiring, according to the forward boundary pixels and the negative boundary pixels, a forward straight line segment and a negative (Continued)

straight line segment which represent the trend of the boundaries of the object to be recognized; when position information of the forward and negative straight line segments matches boundary position information of a known road cone, determining that the object to be recognized is a road cone.

13 Claims, 7 Drawing Sheets

(56) References Cited

U.S. PATENT DOCUMENTS

| | | | |
|---|---|---|---|
| 2007/0127779 A1* | 6/2007 | Miyahara | G01C 3/08 382/106 |
| 2013/0070095 A1 | 3/2013 | Yankun et al. | |
| 2015/0178586 A1* | 6/2015 | Ushijima | G06K 9/00248 382/103 |
| 2017/0177951 A1 | 6/2017 | Yang et al. | |
| 2018/0033148 A1 | 2/2018 | Zheng et al. | |

FOREIGN PATENT DOCUMENTS

| | | |
|---|---|---|
| CN | 105139391 A | 12/2015 |
| CN | 105320940 A | 2/2016 |
| CN | 105447489 A | 3/2016 |
| CN | 106203398 A | 12/2016 |
| CN | 107563331 A | 1/2018 |
| WO | 2017/038134 A1 | 3/2017 |

OTHER PUBLICATIONS

Huang, Y., et al., "Real-time Traffic Cone Detection for Autonomous Vehicle," Proceedings of the 34th Chinese Control Conference, Jul. 28-30, 2015, Hangzhou, China, p. 3718-.

Hongxin, A., et al., "License plate location algorithm based on three-valued image," Journal of Electronic Measurement and Instrument, vol. 26, No. 1, pp. 67-71.

"Edge Detection Method Based on Local Ternary Patterns," Software Guide, vol. 14, No. 1, Jan. 2015, 3 pages.

Zhou, K., et al., "Mineral Floatation Froth Image Edge Detection Method Based on Fuzzy Ternary Pattern," Acta Electronica Sinica, vol. 42, No. 4, Apr. 2014, 8 pages.

* cited by examiner

IMAGE-BASED ROAD CONE RECOGNITION METHOD AND APPARATUS, STORAGE MEDIUM, AND VEHICLE

CROSS REFERENCE TO RELATED APPLICATIONS

This application is a 35 USC § 371 national stage of PCT/CN2019/073875, which is entitled "IMAGE-BASED ROAD CONE RECOGNITION METHOD AND APPARATUS, STORAGE MEDIUM, AND VEHICLE," was filed on Jan. 30, 2019, and claims priority to Chinese Application No. 201810092026.1, filed on Jan. 30, 2018, both of which are incorporated herein by reference as if fully set forth.

FIELD OF THE INVENTION

The present invention relates to the technical field of automatic driving, in particular to a method and device for identifying a traffic cone on the basis of an image, a storage medium and a vehicle.

BACKGROUND OF THE INVENTION

Advanced Driver Assistant Systems (ADAS) can sense surrounding environments by means of various types of sensors mounted on the vehicle, collect data, and identify and track objects in different motion states at any time in a running process of an vehicle, and then operation and analysis of the system are performed according to map data of a navigator, so as to enable a driver to be aware of possible danger in advance to effectively improve the comfortableness and safety of driving.

In order to ensure that the vehicle can smoothly keep away from obstacles in front of the vehicle on a road, whether a to-be-identified object in front of the vehicle is an obstacle or not is often identified through a visual system. For example, whether a to-be-identified object in front of the vehicle on the road is a traffic cone or not is detected, so that the vehicle changes lanes to detour along the cone in advance.

In the related technology, it is difficult to detect a traffic cone in front of a vehicle on a road through a laser radar or a millimeter wave radar. The laser radar is low in resolution and the traffic cone is small in size, so that the traffic cone far away from the vehicle is difficult to detect through the laser radar. Traffic cones are generally made of plastic materials, and the millimeter wave radar cannot acquires effective echo signals to detect the traffic cones. Besides, the traffic cones often have stripe-shaped reflective marks, so that the boundary of a traffic cone image acquired by the visual sensor is fuzzy and discontinuous, and the difficulty of identifying the traffic cones is also increased.

SUMMARY OF THE INVENTION

On that account, the present invention aims to provide a method and device for identifying a traffic cone on the basis of an image, a storage medium and a vehicle so as to solve the problem that the accuracy of the identification of the traffic cone is not high in the related art.

In order to achieve the purpose, the technical solution of the present invention is realized as follows: in the first aspect, provided is a method for identifying a traffic cone on the basis of an image, and the method includes:

acquiring an image of a to-be-identified object in a driving process of a vehicle;

carrying out differential processing on the image to obtain an image subjected to differential processing, and carrying out ternary processing on the image subjected to differential processing according to a preset threshold to obtain a ternary image including positive boundary pixels and negative boundary pixels;

acquiring a positive straight line segment and a negative straight line segment which represent the boundary trend of the to-be-identified object according to the positive boundary pixels and the negative boundary pixels; and determining the to-be-identified object as a traffic cone when position information between the positive straight line segment and the negative straight line segment is matched with the known boundary position information of a traffic cone.

Further, the step of determining the to-be-identified object as a traffic cone when position information between the positive straight line segment and the negative straight line segment is matched with the known boundary position information of the traffic cone comprises:

respectively determining a first inclination angle of the positive straight line segment, a second inclination angle of the negative straight line segment, a first distance between a first end point of the positive straight line segment and a first end point of the negative straight line segment and a second distance between a second end point of the positive straight line segment and a second end point of the negative straight line segment, wherein the first end point of the positive straight line segment corresponds to the first end point of the negative straight line segment in the horizontal direction, and the second end point of the positive straight line segment corresponds to the second end point of the negative straight line segment in the horizontal direction; and determining the to-be-identified object as a traffic cone when the first inclination angle is matched with a first preset inclination angle, the second inclination angle is matched with a second preset inclination angle, the first distance is matched with a first preset distance and the second distance is matched with a second preset distance, wherein the known boundary position information of the traffic cone comprises the first preset inclination angle, the second preset inclination angle, the first preset distance and the second preset distance.

Further, the step of acquiring a positive straight line segment and a negative straight line segment which represent the boundary trend of the to-be-identified object according to the positive boundary pixels and the negative boundary pixels comprises:

grouping the positive boundary pixels and the negative boundary pixels respectively to obtain positive boundary pixel groups and negative boundary pixel groups respectively, wherein the positive boundary pixels or the negative boundary pixels are respectively interconnected with other boundary pixels in respective groups in 8-neighbors manner;

carrying out boundary pixel narrowing on the positive boundary pixel groups and the negative boundary pixel groups respectively in the horizontal direction to respectively obtain positive narrowed boundary pixel groups and negative narrowed boundary pixel groups, wherein the total number of boundary pixels in each of the positive narrowed boundary pixel groups and the negative narrowed boundary pixel groups in the horizontal direction does not exceed a preset threshold; and respectively carrying out Hough transformation on the pixels in the positive narrowed boundary pixel groups and the pixels in the negative narrowed boundary pixel groups to obtain the positive straight line segment and the negative straight line segment.

Further, the step of respectively carrying out Hough transformation on the pixels in the positive narrowed boundary pixel groups and the pixels in the negative narrowed boundary pixel groups to obtain the positive straight line segment and the negative straight line segment comprises:

respectively carrying out Hough transformation on the pixels in the positive narrowed boundary pixel groups and the pixels in the negative narrowed boundary pixel groups to obtain a positive straight line and a negative straight line which represent the boundary trend of the to-be-identified object;

matching the positive boundary pixels with the positive straight line to determine two end points from the positive straight line, wherein a segment between the two end points is the positive straight line segment; and matching the negative boundary pixels with the negative straight line to determine two end points from the negative straight line, wherein a segment between the two end points is the negative straight line segment.

Further, the step of matching the positive boundary pixels with the positive straight line to determine the two end points from the positive straight line comprises:

determining target positive boundary pixels from the positive boundary pixels, wherein the distance from the target positive boundary pixels to the positive straight line is smaller than a preset distance; and determining a first end point in the two end points according to a pixel with the maximum vertical coordinate value in the vertical direction in the target positive boundary pixels, and determining a second end point in the two end points according to a pixel with the minimum vertical coordinate value in the vertical direction in the target positive boundary pixels.

Further, the step of carrying out Hough transformation on the pixels in the positive narrowed boundary pixel groups to obtain a positive straight line for representing the boundary trend of the to-be-identified object comprises: eliminating invalid groups from the plurality of positive narrowed boundary pixel groups, wherein the regional position distance between the regional position of the invalid groups and the average regional position of other groups is greater than a preset distance threshold; and carrying out Hough transformation on the pixels in the positive narrowed boundary pixel groups after the invalid groups are eliminated to obtain a positive straight line for representing the boundary trend of the to-be-identified object.

In the second aspect, provided is a device for identifying a traffic cone on the basis of an image, the device includes:

an image acquiring module, used for acquiring an image of a to-be-identified object in a driving process of a vehicle;

a boundary detecting module, used for carrying out differential processing on the image to obtain an image subjected to differential processing, carrying out ternary processing on the image subjected to differential processing according to a preset threshold to obtain a ternary image including positive boundary pixels and negative boundary pixels;

an analyzing module, used for acquiring a positive straight line segment and a negative straight line segment which represent the boundary trend of the to-be-identified object according to the positive boundary pixels and the negative boundary pixels; and a determination module, used for determining the to-be-identified object as a traffic cone when position information between the positive straight line segment and the negative straight line segment is matched with the known boundary position information of the traffic cone.

Further, the determination module is used for:

respectively determining a first inclination angle of the positive straight line segment, a second inclination angle of the negative straight line segment, a first distance between a first end point of the positive straight line segment and a first end point of the negative straight line segment and a second distance between a second end point of the positive straight line segment and a second end point of the negative straight line segment, wherein the first end point of the positive straight line segment corresponds to the first end point of the negative straight line segment in the horizontal direction, and the second end point of the positive straight line segment corresponds to the second end point of the negative straight line segment in the horizontal direction; and determining the to-be-identified object as a traffic cone when the first inclination angle is matched with a first preset inclination angle, the second inclination angle is matched with a second preset inclination angle, the first distance is matched with a first preset distance and the second distance is matched with a second preset distance, wherein the known boundary position information of the traffic cone comprises the first preset inclination angle, the second preset inclination angle, the first preset distance and the second preset distance.

Further, the analyzing module comprises:

a grouping submodule, used for respectively grouping the positive boundary pixels and the negative boundary pixels to obtain positive boundary pixel groups and negative boundary pixel groups respectively, wherein the positive boundary pixels or the negative boundary pixels are respectively interconnected with other boundary pixels in respective groups in 8-neighbors manner;

a pixel narrowing submodule, used for carrying out boundary pixel narrowing on the positive boundary pixel groups and the negative boundary pixel groups respectively in the horizontal direction to obtain positive narrowed boundary pixel groups and negative narrowed boundary pixel groups respectively, wherein the total number of boundary pixels of each of the positive narrowed boundary pixel groups and the negative narrowed boundary pixel groups in the horizontal direction does not exceed a preset threshold; and a boundary optimizing submodule, used for carrying out Hough transformation on the pixels in the positive narrowed boundary pixel groups and the pixels in the negative narrowed boundary pixel groups respectively to obtain the positive straight line segment and the negative straight line segment.

Further, the boundary optimizing submodule is used for:

respectively carrying out Hough transformation on the pixels in the positive narrowed boundary pixel groups and the pixels in the negative narrowed boundary pixel groups to obtain a positive straight line and a negative straight line which represent the boundary trend of the to-be-identified object;

matching the positive boundary pixels with the positive straight line to determine two end points from the positive straight line, wherein a segment between the two end points is the positive straight line segment; and matching the negative boundary pixels with the negative straight line to determine two end points from the negative straight line, wherein a segment between the two end points is the negative straight line segment.

Further, the boundary optimizing submodule is used for:

determining target positive boundary pixels from the positive boundary pixels, wherein the distance from the target positive boundary pixels to the positive straight line is smaller than a preset distance; and determining a first end point in the two end points according to a pixel with the maximum vertical coordinate value in the vertical direction in the target positive boundary pixels, and determining a second end point in the two end points according to a pixel with the minimum vertical coordinate value in the vertical direction in the target positive boundary pixels.

Further, the boundary optimizing submodule is used for:

eliminating invalid groups from the plurality of positive narrowed boundary pixel groups, wherein the regional position distance between the regional position of the invalid groups and the average regional position of other groups is greater than a preset distance threshold; and carrying out Hough transformation on the pixels in the positive narrowed boundary pixel groups after the invalid groups are eliminated to obtain the positive straight line for representing the boundary trend of the to-be-identified object.

In a third aspect, provided is a computer readable storage medium, a computer program is stored on the computer readable storage medium, and when the program is executed by a processor, steps of the method for identifying the traffic cone on the basis of the image are implemented.

In a fourth aspect, provided is a device for identifying a traffic cone on the basis of an image, the device includes:

the computer readable storage medium in the third aspect; and one or more processors, used for executing the program in the computer readable storage medium.

In a fifth aspect, provided is a vehicle, the vehicle includes the device for identifying the traffic cone on the basis of the image in the second aspect or in the fourth aspect.

Compared with the prior art, the method for identifying the traffic cone on the basis of the image in the present invention has the following advantages:

according to the technical solution of the present invention, the positive boundary pixels and the negative boundary pixels are extracted from the image of the to-be-identified object, the positive straight line segment and the negative straight line segment which represent the boundary trend of the to-be-identified object are further acquired through the boundary pixels, thus, when the position information between the positive straight line segment and the negative straight line segment is matched with the known boundary position information of the traffic cone, the to-be-identified object is determined as a traffic cone, and the accuracy of identification of the traffic cone can be improved. Compared with the prior art, the device and method for identifying the traffic cone on the basis of the image have the same advantages and are not repeated herein.

BRIEF DESCRIPTION OF DRAWINGS

The accompanying drawings, which form a part hereof, serve to provide a further understanding of the present invention, and the illustrative embodiments of the present invention and the description thereof serve to explain the present invention and are not intended to be unduly limiting thereof. In the drawings.

DETAILED DESCRIPTION OF THE EMBODIMENTS

It should be noted that embodiments of the present invention and features of the embodiments may be combined with each other without conflict. If not emphasized separately in the following description, 'v' denotes the vertical direction, and 'h' denotes the horizontal direction.

Figure 1:
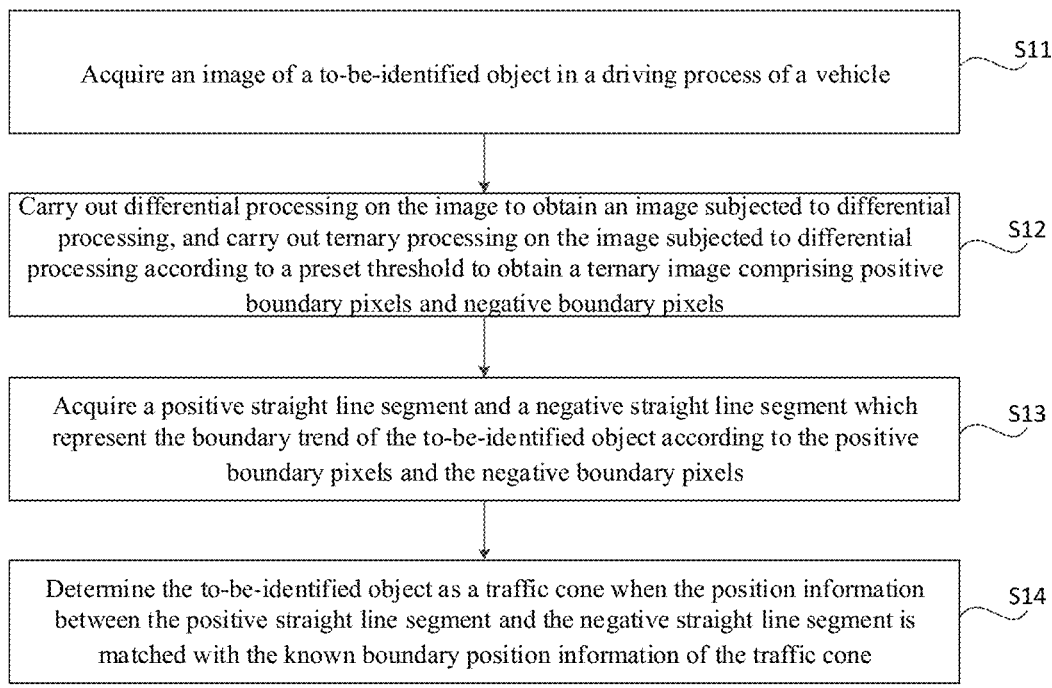
FIG. 1 is a flowchart illustrating a method of identifying a traffic cone on the basis of an image according to an exemplary embodiment of the present invention.

FIG. 1 shows a method for identifying a traffic cone on the basis of an image according to an exemplary embodiment of the present invention. The method includes:

S11, an image of a to-be-identified object is acquired in a driving process of a vehicle.

In the present invention, a monocular vision system may be adopted, preferably, the vision system may acquire images of which pixels are greater than 1 M through a long-focal length lens.

Figure 2:
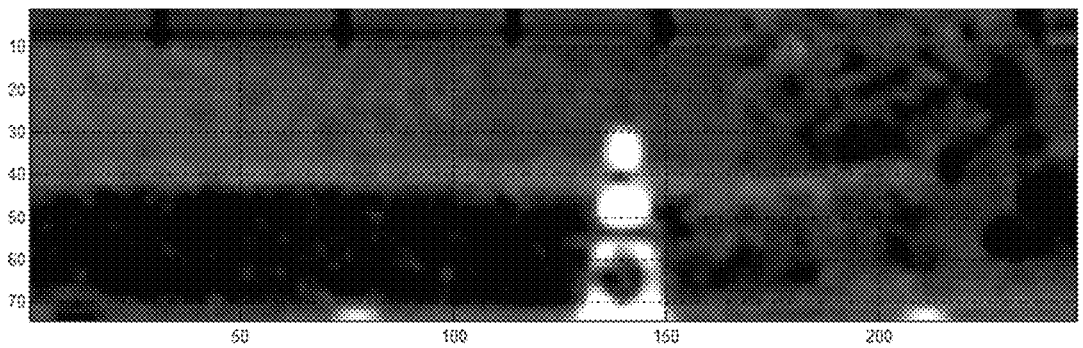
FIG. 2 is a diagram illustrating an example of an image acquiring result according to an exemplary embodiment of the present invention.

Exemplarily, the acquired image is shown as FIG. 2. FIG. 2 may be a global image acquired from a monocular camera. In order to improve the efficiency of image processing in the later period, a sub-image including a to-be-identified object may also be intercepted from the global image. As shown in FIG. 2, it can be observed that the boundary of the to-be-identified object is fuzzy and discontinuous.

S12, the image is subjected to differential processing, thus, an image subjected to differential processing is obtained, and the image subjected to differential processing is subjected to ternary processing according to a preset threshold to obtain a ternary image including positive boundary pixels and negative boundary pixels.

Specifically, the image may be processed through a Sobel filter. FIG. 2 is a schematic diagram illustrating a process of image processing through the Sobel filter FFF.

$$FFF = \begin{bmatrix} -1 & 0 & 1 \\ -2 & 0 & 2 \\ -1 & 0 & 1 \end{bmatrix} \quad (1)$$

Figure 3:
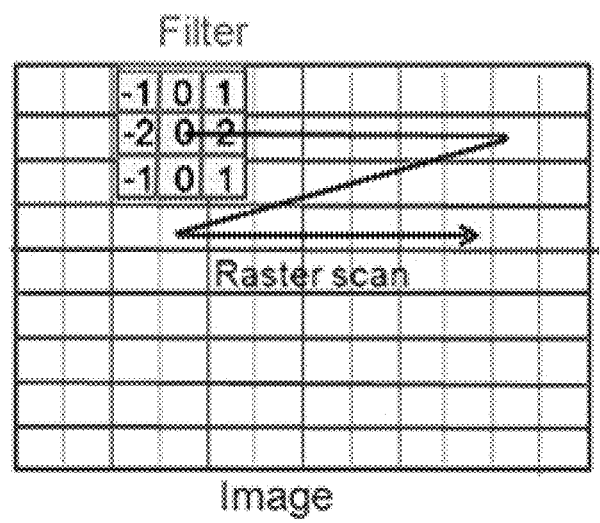
FIG. 3 is a diagram illustrating an example of an image processing principle according to an exemplary embodiment of the present invention.

As shown in FIG. 3, Raster Scan sweeps through every pixel point on the image in the horizontal direction and transforms XXX (m, n) on the original image into a differential image YYY (m, n), reference may be made specifically to the following code:

```
for m=2:mm-1
    for n=2:nn-1
        W=XXX(m-1:m+1,n-1:n+1);
        WF=W.*FFF;
        YYY(m,n)=sum(WF(:));
    end
end
```

Further, binarization or ternary processing may be performed on the differential image YYY (m, n). Specifically, reference may be made to the following ternary image TTT (m, n) code to obtain a ternary image TTT (m, n):

```
for m=1:mm
    for n=1:nn
        TTT(m,n)=0
        if YYY(m,n)>Threshold
            TTT (m,n)=1
        else if YYY(m,n)<-Threshold
            TTT (m,n)=-1
        end
    end
end
```

After ternary image processing, the value of each pixel point in the obtained ternary image TTT (m, n) is selected from a set [−1, 0, 1]. Therefore, the pixel points larger than the preset threshold in the differential image YYY (m, n) are assigned to be 1, the pixel points smaller than the threshold in the differential image YYY (m, n) are assigned to be −1, and the other pixel points are assigned to be 0. Thus, a positive boundary pixel with a value of 1 and a negative boundary pixel with a value of −1 may be distinguished, and other pixels except the boundary pixels are assigned to be 0.

Figure 4:
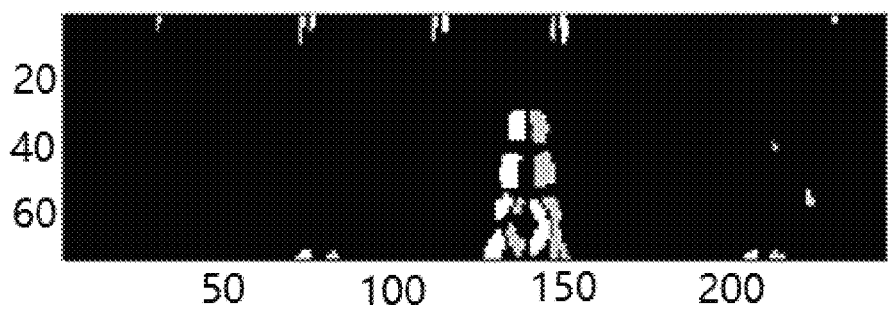
FIG. 4 is a diagram illustrating an example of an image processing result according to an exemplary embodiment of the present invention.
Figure 5:
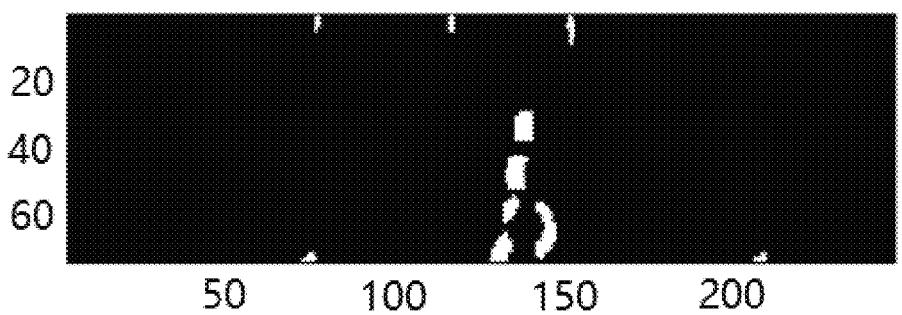
FIG. 5 is a diagram illustrating an example of an image processing result according to an exemplary embodiment of the present invention.

Exemplarily, the ternary image TTT (m, n) shown in FIG. 4 is obtained after image processing in FIG. 2. The positive boundary pixels and the negative boundary pixels may be distinguished in the image obtained after processing. As shown in FIG. 5, the positive boundary pixels may be extracted separately.

S13, a positive straight line segment and a negative straight line segment which represent the boundary trend of the to-be-identified objected are acquired according to the positive boundary pixels and the negative boundary pixels.

Firstly, the positive boundary pixels and the negative boundary pixels are grouped respectively to obtain positive boundary pixel groups and negative boundary pixel groups, and the positive boundary pixels or the negative boundary pixels in each group are interconnected with other boundary pixels based on 8-neighbors, respectively.

Figure 6:
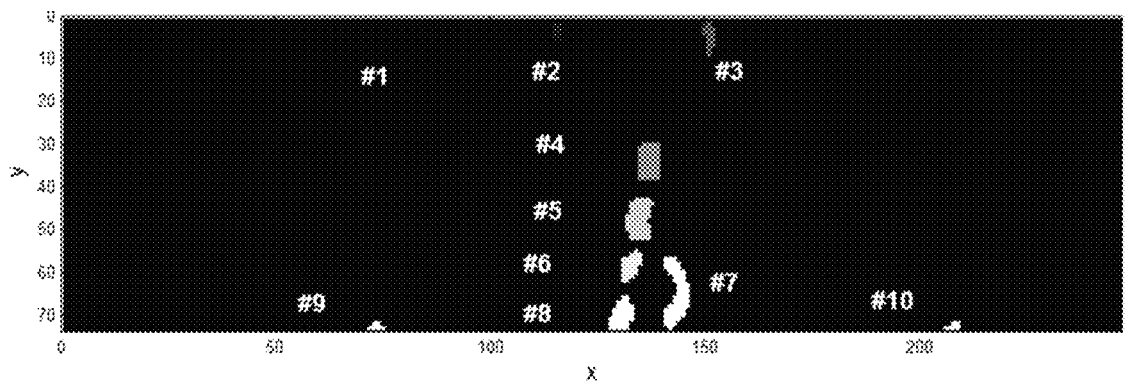
FIG. 6 is a diagram illustrating an example of an image processing result according to an exemplary embodiment of the present invention.

Specifically, reference is made to a schematic diagram illustrating grouping of the positive boundary pixel groups as shown in FIG. 6. The entire image contains pixels total=18278, wherein the positive boundary pixels features=263. Excluding the position boundary pixels on the image, there are 18015 pixels (pixel coordinate range v (1, 74) h (1, 247)) as background pixels. Specifically, the pixel distribution information of each positive boundary pixel group is shown in table 1.

TABLE 1

| Group number | Number of pixels in every positive boundary group | Pixel coordinate range of every positive boundary pixel group |
|---|---|---|
| #1 | 7 | v (2, 5) h (75, 76) |
| #2 | 8 | v (2, 5) h (115, 116) |
| #3 | 16 | v (2, 9) h (150, 152) |
| #4 | 44 | v (30, 38) h (135, 139) |
| #5 | 53 | v (43, 52) h (132, 138) |
| #6 | 27 | v (55, 62) h (131, 135) |
| #7 | 61 | v (57, 73) h (141, 146) |
| #8 | 35 | v (66, 73) h (128, 133) |
| #9 | 6 | v (72, 73) h (72, 75) |
| #10 | 6 | v (72, 73) h (206, 209) |

No matter in the positive boundary pixel groups or the negative boundary pixel groups, the boundary pixels in each group have a wider range in the horizontal direction.

Figure 7:
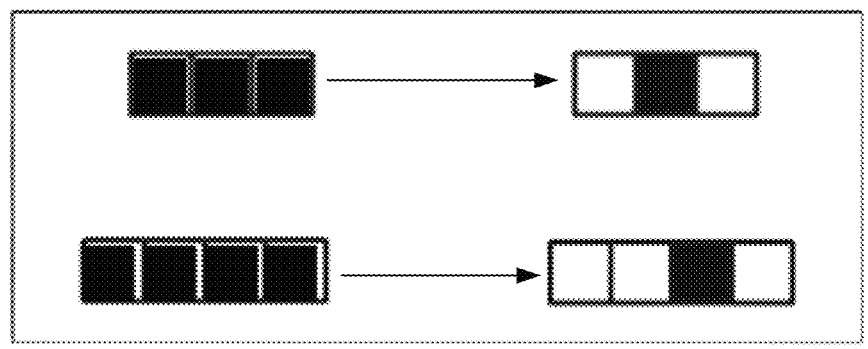
FIG. 7 is a diagram illustrating an example of an image processing principle according to an exemplary embodiment of the present invention.

Then, the positive boundary pixel groups and the negative boundary pixel groups are subjected to boundary pixel narrowing respectively in the horizontal direction to obtain positive narrowed boundary pixel groups and negative narrowed boundary pixel groups respectively, and the total number of boundary pixels in the horizontal direction in each of the positive narrowed boundary pixel groups and the negative narrowed boundary pixel groups does not exceed a preset threshold. FIG. 7 is a schematic diagram of a principle of boundary pixel narrowing in the horizontal direction. For example, a certain row in a certain positive boundary pixel group includes three positive boundary pixels, only a middle pixel is reserved in the positive narrowed boundary pixel group obtained after boundary pixel narrowing, and the remaining two pixels are assigned to be the same as the background pixels. For another example, a certain row in a certain positive boundary pixel group includes four positive boundary pixels, only a second pixel or a third pixel counted from left to right is reserved in the positive narrowed boundary pixel group obtained after boundary pixel narrowing, and the remaining three pixels are assigned to be the same as the background pixels.

Figure 8:
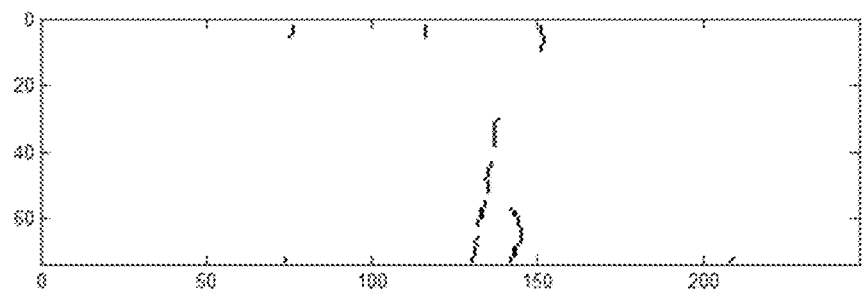
FIG. 8 is a diagram illustrating an example of an image processing result according to an exemplary embodiment of the present invention.

Exemplarily, reference is made to a schematic diagram illustrating grouping of the positive narrowed boundary pixel group as shown in FIG. 8. The entire image contains pixels total=18278, wherein narrowed positive boundary pixels features=72. Excluding the position boundary pixels on the image, andthere are 18206 pixels (pixel coordinate range v (1, 74) h (1, 247)) as background pixels. Specifically, the pixel distribution information for each narrowed positive boundary pixel group is shown in table 2.

TABLE 2

| Group number | Number of pixels in each positive boundary group | Pixel coordinate range of each positive boundary pixel group |
|---|---|---|
| #1 | 4 | v (2, 5) h (75, 76) |
| #2 | 4 | v (2, 5) h (116, 116) |
| #3 | 8 | v (2, 9) h (151, 152) |
| #4 | 9 | v (30, 38) h (137, 138) |
| #5 | 10 | v (43, 52) h (134, 136) |
| #6 | 8 | v (55, 62) h (132, 134) |
| #7 | 17 | v (57, 73) h (142, 145) |
| #8 | 8 | v (66, 73) h (130, 132) |
| #9 | 2 | v (72, 73) h (74, 74) |
| #10 | 2 | v (72, 73) h (208, 209) |

After boundary pixel narrowing, the number of the selected positive boundary pixels is reduced from 263 shown in FIGS. 6 to 72 shown in FIG. 8. The positive narrowed boundary pixel group retains the boundary information in the original image, can represent the boundary trend of the to-be-identified object, and meanwhile reduces the complexity of subsequent image processing.

Then, the positive narrowed boundary pixel groups and the negative narrowed boundary pixel groups are respectively subjected to Hough transformation to obtain the positive straight line segment and the negative straight line segment.

Optionally, before Hough transformation is carried out, invalid groups are eliminated from the plurality of positive narrowed boundary pixel groups, wherein the regional position distance between the regional position of the invalid groups and the average regional position of other groups is greater than a preset distance threshold. Therefore, subsequent calculation amount can be reduced, and the accuracy of a processing result is improved. The preset distance threshold may be set according to the known height of the traffic cone. For example, the preset distance threshold is set as the known height of the traffic cone, or the preset distance threshold is set as a multiple of the known height of the traffic cone.

Pixels in the positive narrowed boundary pixel groups are subjected to Hough transformation after the invalid groups are eliminated to obtain a positive straight line representing the boundary trend of the to-be-identified object. A method for acquiring a negative straight line representing the boundary trend of the to-be-identified object is the same as the method for acquiring the positive straight line representing the boundary trend of the to-be-identified object, and is not repeated herein.

Figure 9:
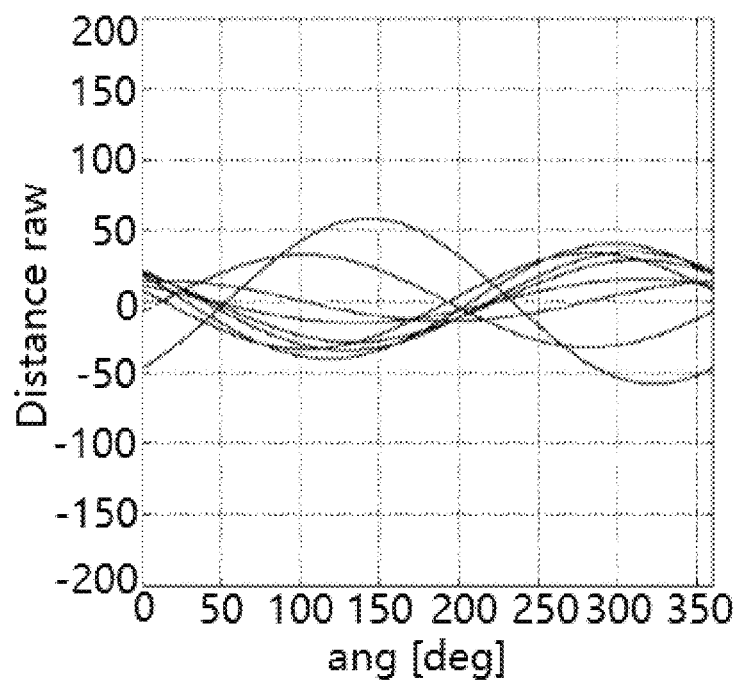
FIG. 9 is a diagram illustrating an example of an image processing result according to an exemplary embodiment of the present invention.

Specifically, a Hough transformation process is as follows:

1) a positive Hough curve and a negative Hough curve are respectively obtained according to the positive narrowed boundary pixel groups and the negative narrowed boundary pixel groups. The positive narrowed boundary pixel group shown in FIG. 8 is taken as an example, each positive boundary pixel point (iv, ih) in the group is each positive boundary pixel point (iv, ih) in the group is converted by the following formula to obtain a forward Hough curve (x, y) as shown in FIG. 9:

$y=-(iv-\text{fix}(MM/2))$; % y: upward $x=ih-(\text{fix}(NN/2))$;

Wherein, MM is the maximum value of coordinates of the positive boundary pixels in the vertical direction in FIG. 8; and NN is the maximum value of coordinates of the positive boundary pixels in the horizontal direction in FIG. 8.

2) The positive Hough curve and the negative Hough curve are respectively subjected to histogram transformation to respectively obtain the number of peaks and centroid of the positive Hough curve as well as the number of peaks and centroid of the negative Hough curve.

Reference is made to program codes which calculate the number of peaks as follows:

| | |
|---|---|
| H(1:nnR,1:nnAng): histogram is binarized. | |
| binH(1:nnR, 1:nnAng)=H*0; | % H:histogram |
| binH(H>=threshold)=1; | % Binary |
| HL=fnc_Labeling(binH); | % Labeling of binary image |
| nL=max(HL(:)) | % number of peaks (labels) |

Reference is made to program codes which calculate the centroid as follows:

| | |
|---|---|
| rrG(1:nL); | % CG of the range for each connected region |
| aangG(1:nL); | % CG of the angles |
| rrG & aangG:n1=2 | |
| rrG: 50, 110, | |
| aangG: 151, 31, | |

3) A positive straight line representing the boundary trend of the to-be-identified object is obtained according to the number of peaks and centroid of the positive Hough curve, and a negative straight line representing the boundary trend of the to-be-identified object is obtained according to the number of peaks and centroid of the negative Hough curve.

Peak points are connected on a Hough plane, the peak points which are connected into the same group are marked, and the marking result is shown as table 3.

TABLE 3

Figure 10:
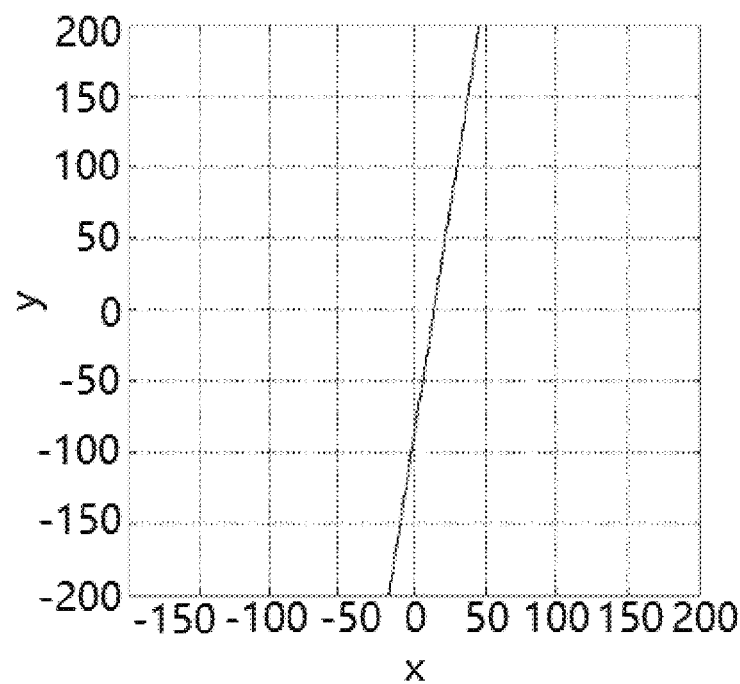
FIG. 10 is a diagram illustrating an example of an image processing result according to an exemplary embodiment of the present invention.

| Peaks in Hough histogram, FIG. 10 (a) | | |
|---|---|---|
| # 1 | number of peaks = 11 | range (14, 16), ang (347, 354) |
| # 2 | number of peaks = 1 | range (15, 15), ang (16, 16) |
| # 3 | number of peaks = 1 | range (16, 16), ang (14, 14) |
| # 4 | number of peaks = 1 | range (17, 17), ang (343, 343) |

Through comparison, a group #1 which includes the largest number of peaks is selected. After connection of peaks, the centroid of the group is calculated. The centroid information of the selected group #1 on the Hough plane is as follows:

*rrG & aangG:* n1=1

*rrG:* 14,

*angG:* 351, the selected group #1 may be used for directly obtaining the positive straight line representing the boundary trend of the to-be-identified object, as shown in FIG. 10.

4) The positive boundary pixels are matched with the positive straight line so as to determine two end points from the positive straight line, and a segment between the two end points is the positive straight line segment.

Specifically, it includes that: target positive boundary pixels are determined from the positive boundary pixels, wherein the distance from target positive boundary pixels to the positive straight line is smaller than a preset distance; a first end point in the two end points is determined according to a pixel with the maximum vertical coordinate value in the vertical direction in the target positive boundary pixels, and a second end point in the two end points is determined according to a pixel with the minimum vertical coordinate value in the vertical direction in the target positive boundary pixels.

Figure 11:
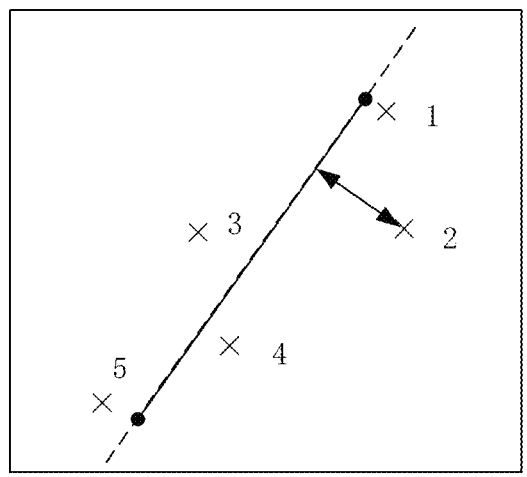
FIG. 11 is a diagram illustrating an example of an image processing principle according to an exemplary embodiment of the present invention.

For example, as shown in FIG. 11, the distance between a total of 5 pixels (1, 2, 3, 4 and 5) and the positive straight line (dashed line) is smaller than the preset distance. The first end point on the positive straight line is determined through the pixel 1 with the maximum vertical coordinate, and the second end point on the positive straight line is determined through the pixel 5 with the minimum vertical coordinate.

Figure 12:
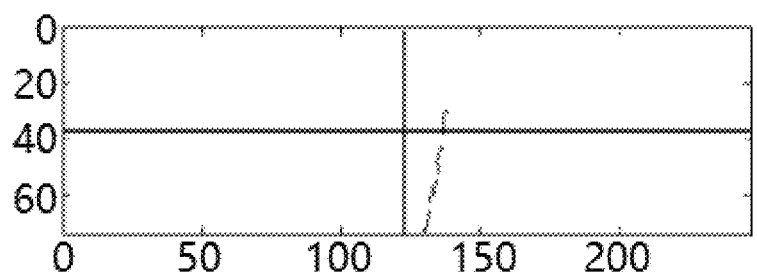
FIG. 12 is a diagram illustrating an example of an image processing result according to an exemplary embodiment of the present invention.

FIG. 12 shows the target positive boundary pixels, wherein the distance from the target positive boundary pixels to the positive straight line as shown in FIG. 10 is smaller than the preset distance.

Figure 13:
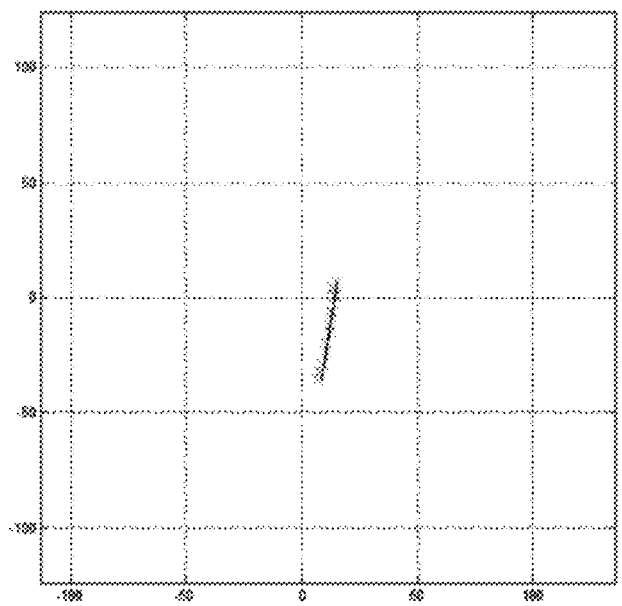
FIG. 13 is a diagram illustrating an example of an image processing result according to an exemplary embodiment of the present invention.

The positive straight line segment determined and obtained through the target positive boundary pixels is shown as FIG. 13.

5) The negative boundary pixels are matched with the negative straight line to determine two end points from the negative straight line, and the segment between the two end points is the negative straight line segment.

Figure 14:
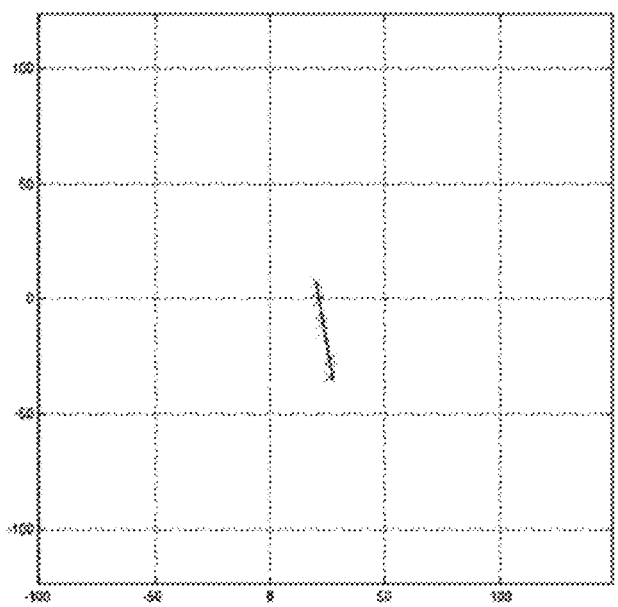
FIG. 14 is a diagram illustrating an example of an image processing result according to an exemplary embodiment of the present invention.

The determination process of the negative straight line segment is similar to that of the positive straight line segment, the obtained negative straight line segment is shown in FIG. 14, and it is not repeated herein.

S14, when the position information between the positive straight line segment and the negative straight line segment is matched with the known boundary position information of the traffic cone, the to-be-identified object is determined as a traffic cone.

Figure 15:
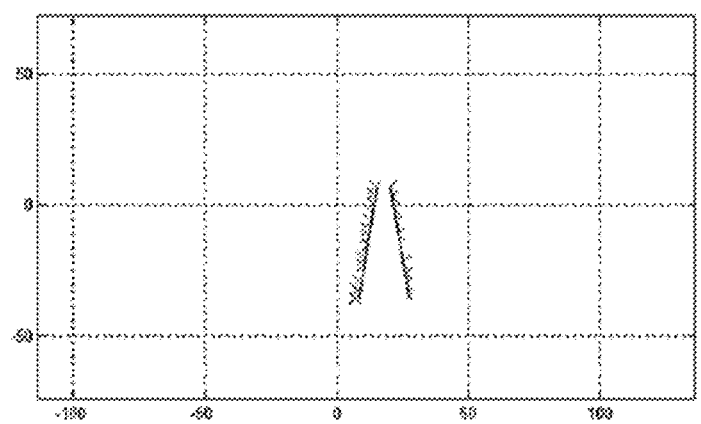
FIG. 15 is a diagram illustrating an example of an image processing result according to an exemplary embodiment of the present invention.

FIG. 15 is an effect diagram of combining the obtained positive straight line segment with the obtained negative straight line segment on the same image. The positive straight line segment is shown on the left side, and the negative straight line segment is shown on the right side. According to the above, the positive straight line segment and the negative straight line segment may be used for characterizing the boundary contour of the to-be-identified object. In order to further judge whether the to-be-identified object is a traffic cone or not, the boundary contour needs to be matched with the known boundary position information of the traffic cone, and the known boundary position information of the traffic cone includes a first preset inclination angle, a second preset inclination angle, a first preset distance and a second preset distance.

Figure 16:
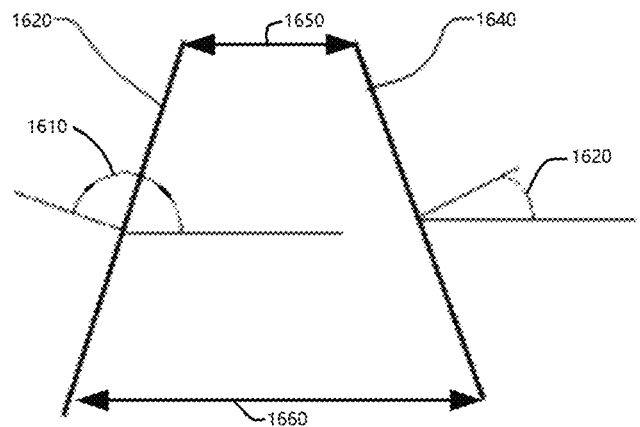
FIG. 16 is a diagram illustrating an example of an image processing principle according to an exemplary embodiment of the present invention.

Detailed description will be made below with FIG. 16 as an example. A first inclination angle $\theta_1$ 1610 of the positive straight line segment 1620, a second inclination angle $\theta_2$ 1630 of the negative straight line segment 1640, a first distance Separation-1 1650 between the first end point of the positive straight line segment 1620 and the first end point of the negative straight line segment 1640 and a second distance Separation-2 1660 between the second end point of the positive straight line 1620 segment and the second end point of the negative straight line segment 1640 are determined respectively, wherein the first end point of the positive straight line section corresponds to the first end point of the negative straight line section in the horizontal direction, and the second end point of the positive straight line section corresponds to the second end point of the negative straight line section in the horizontal direction; and when the first inclination angle $\theta_1$ 1610 is matched with the first preset inclination angle, the second inclination angle $\theta_2$ 1630 is matched with the second preset inclination angle, the first distance Separation-1 1650 is matched with the first preset distance, and the second distance Separation-2 1660 is matched with the second preset distance, the to-be-identified object is determined as a traffic cone. According to the technical solution of the present invention, the positive boundary pixels and the negative boundary pixels are extracted from the image of the to-be-identified object, and further, the positive straight line segment and the negative straight line segment which represent the boundary trend of the to-be-identified object are obtained through the boundary pixels, therefore, when the position information between the positive straight line segment and the negative straight line segment is matched with the known boundary position information of the traffic cone, the to-be-identified object is determined as a traffic cone, and the accuracy of identification of the traffic cone may be improved.

Figure 17:
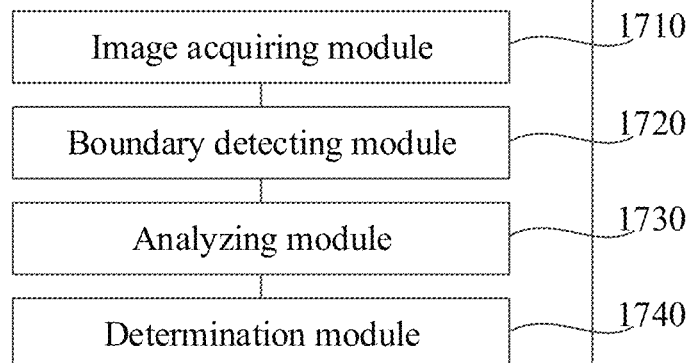
FIG. 17 is a block diagram illustrating a device for identifying a traffic cone on the basis of an image according to an exemplary embodiment of the present invention.

FIG. 17 is a block diagram illustrating a device for identifying a traffic cone on the basis of an image according to an exemplary embodiment of the present invention, and the device includes: an image acquiring module 1710, used for acquiring an image of the to-be-identified object in a driving process of a vehicle;

a boundary detecting module 1720, used for carrying out differential processing on the image to obtain an image subjected to differential processing, and carrying out ternary processing on the image subjected to differential processing according to a preset threshold to obtain a ternary image including positive boundary pixels and negative boundary pixels;

an analyzing module 1730, used for acquiring a positive straight line segment and a negative straight line segment which represent the boundary trend of the to-be-identified object according to the positive boundary pixels and the negative boundary pixels; and a determination module 1740, used for determining the to-be-identified object as a traffic cone when the position information between the positive straight line segment and the negative straight line segment is matched with the known boundary position information of the traffic cone.

Further, the determination module 1740 is used for, respectively determining a first inclination angle of the positive straight line segment and a second inclination angle of the negative straight line segment, a first distance between the first end point of the positive straight line segment and the first end point of the negative straight line segment and a second distance between the second end point of the positive straight line segment and the second end point of the negative straight line segment, wherein the first end point of the positive straight line segment corresponds to the first end point of the negative straight line segment in the horizontal direction, and the second end point of the positive straight line segment corresponds to the second end point of the negative straight line segment in the horizontal direction; and determining the to-be-identified object as a traffic cone when the first inclination angle is matched with a first preset inclination angle, the second inclination angle is matched with a second preset inclination angle, the first distance is matched with a first preset distance and the second distance is matched with a second preset distance, wherein the known boundary position information of the traffic cone includes the first preset inclination angle, the second preset inclination angle, the first preset distance and the second preset distance.

Further, the analyzing module 1730 includes:

a grouping submodule, used for respectively grouping the positive boundary pixels and the negative boundary pixels to respectively obtain positive boundary pixel groups and negative boundary pixel groups, wherein the positive boundary pixels or the negative boundary pixels are respectively interconnected with other boundary pixels in respective groups in 8-neightbor manner;

a pixel narrowing submodule, used for respectively carrying out boundary pixel narrowing on the positive boundary pixel groups and the negative boundary pixel groups in the horizontal direction to respectively obtain positive narrowed boundary pixel groups and negative narrowed boundary pixel groups, wherein the total number of boundary pixels in each of the positive narrowed boundary pixel groups and the negative narrowed boundary pixel groups in the horizontal direction does not exceed a preset threshold; and a boundary optimizing submodule, used for carrying out Hough transformation on pixels in the positive narrowed boundary pixel groups and pixels in the negative narrowed boundary pixel groups respectively to obtain the positive straight line segment and the negative straight line segment.

Further, the boundary optimizing submodule is used for:

carrying out Hough transformation on pixels in the positive narrowed boundary pixel groups and pixels in the negative narrowed boundary pixel groups respectively to obtain a positive straight line and a negative straight line which represent the boundary trend of the to-be-identified object;

matching the positive boundary pixels with the positive straight line to determine two end points from the positive straight line, wherein a segment between the two end points is the positive straight line segment; and matching the negative boundary pixels with the negative straight line to determine two end points from the negative straight line, wherein a segment between the two end points is the negative straight line segment.

Further, the boundary optimizing submodule is used for:

determining target positive boundary pixels from the positive boundary pixels, wherein the distance from the target positive boundary pixels to the positive straight line is smaller than a preset distance; and determining a first end point in the two end points according to a pixel with the maximum vertical coordinate value in the vertical direction from the target positive boundary pixels, and determining a second end point in the two end points according to a pixel with the minimum vertical coordinate value in the vertical direction from the target positive boundary pixels.

Further, the boundary optimizing submodule is used for:

eliminating invalid groups from the plurality of positive narrowed boundary pixel groups, wherein the regional position distance between the regional position of the invalid groups and the average regional position of other groups is greater than a preset distance threshold; and carrying out Hough transformation on pixels in the positive narrowed boundary pixel groups after the invalid groups are eliminated to obtain a positive straight line representing the boundary trend of the to-be-identified object.

An embodiment of the present invention further provides a computer readable storage medium, a computer program is stored on the computer readable storage medium, and when the program is executed by a processor, steps of the method for identifying the traffic cone on the basis of the image are implemented. The computer readable storage medium includes various media capable of storing program codes such as a USB flash disk, a mobile hard disk drive, a read-only memory (ROM), a random access memory (RAM), a magnetic disk or an optical disk.

An embodiment of the present invention further provides a device for identifying a traffic cone on the basis of an image, and the device includes: the computer readable storage medium; and one or more processors for executing the program in the computer readable storage medium.

An embodiment of the present invention further provides a vehicle, and the vehicle includes the device for identifying the traffic cone on the basis of the image.

More implementation details and effects of the device for identifying the traffic cone on the basis of the image, the computer readable storage medium and the vehicle can be referred to the embodiment of the method for identifying the traffic cone on the basis of the image, and are not described in detail herein.

The above description is only for the purpose of illustrating the preferred embodiments of the present invention and should not be taken as limiting the present invention, and any modification, equivalent replacement and improvement made according to the spirit and principle of the present invention shall be regarded as within the scope of protection of the present invention.

The invention claimed is:

1. A method for identifying a traffic cone on a basis of an image of a to-be-identified object, comprising:

acquiring the image of the to-be-identified object in a driving process of a vehicle;

carrying out differential processing on the image to obtain an image subjected to differential processing, and carrying out ternary processing on the image subjected to differential processing according to a preset threshold to obtain a ternary image comprising positive boundary pixels and negative boundary pixels;

acquiring a positive straight line segment and a negative straight line segment which represent a boundary trend of the to-be-identified object according to the positive boundary pixels and the negative boundary pixels; and determining the to-be-identified object as the traffic cone when position information between the positive straight line segment and the negative straight line segment is matched with known boundary position information of the traffic cone.

2. The method according to claim 1, wherein the step of determining the to-be-identified object as the traffic cone when position information between the positive straight line segment and the negative straight line segment is matched with the known boundary position information of the traffic cone comprises:

respectively determining a first inclination angle of the positive straight line segment, a second inclination angle of the negative straight line segment, a first distance between a first end point of the positive straight line segment and a first end point of the negative straight line segment and a second distance between a second end point of the positive straight line segment and a second end point of the negative straight line segment, wherein the first end point of the positive straight line segment corresponds to the first end point of the negative straight line segment in a horizontal direction, and the second end point of the positive straight line segment corresponds to the second end point of the negative straight line segment in the horizontal direction; and determining the to-be-identified object as the traffic cone when the first inclination angle is matched with a first preset inclination angle, the second inclination angle is matched with a second preset inclination angle, the first distance is matched with a first preset distance and the second distance is matched with a second preset distance, wherein the known boundary position information of the traffic cone comprises the first preset inclination angle, the second preset inclination angle, the first preset distance and the second preset distance.

3. The method according to claim 1, wherein the step of acquiring the positive straight line segment and the negative straight line segment which represent the boundary trend of the to-be-identified object according to the positive boundary pixels and the negative boundary pixels comprises:

grouping the positive boundary pixels and the negative boundary pixels respectively to obtain positive boundary pixel groups and negative boundary pixel groups respectively, wherein the positive boundary pixels or the negative boundary pixels are respectively interconnected with other boundary pixels in respective groups in all directions;

carrying out boundary pixel narrowing on the positive boundary pixel groups and the negative boundary pixel groups respectively in a horizontal direction to respectively obtain positive narrowed boundary pixel groups and negative narrowed boundary pixel groups, wherein a total number of boundary pixels in each of the positive narrowed boundary pixel groups and the negative narrowed boundary pixel groups in the horizontal direction does not exceed a preset threshold; and respectively carrying out Hough transformation on the pixels in the positive narrowed boundary pixel groups and the pixels in the negative narrowed boundary pixel groups to obtain the positive straight line segment and the negative straight line segment.

4. The method according to claim 3, wherein the step of respectively carrying out Hough transformation on the pixels in the positive narrowed boundary pixel groups and the pixels in the negative narrowed boundary pixel groups to obtain the positive straight line segment and the negative straight line segment comprises:

respectively carrying out Hough transformation on the pixels in the positive narrowed boundary pixel groups and the pixels in the negative narrowed boundary pixel groups to obtain a positive straight line and a negative straight line which represent the boundary trend of the to-be-identified object;

matching the positive boundary pixels with the positive straight line to determine two end points from the positive straight line, wherein a segment between the two end points is the positive straight line segment; and matching the negative boundary pixels with the negative straight line to determine two end points from the negative straight line, wherein a segment between the two end points from the negative straight line is the negative straight line segment.

5. The method according to claim 4, wherein the step of matching the positive boundary pixels with the positive straight line to determine the two end points from the positive straight line comprises:

determining target positive boundary pixels from the positive boundary pixels, wherein a distance from the target positive boundary pixels to the positive straight line is smaller than a preset distance; and determining a first end point in the two end points from the positive straight line according to a pixel with the maximum vertical coordinate value in a vertical direction in the target positive boundary pixels, and determining a second end point in the two end points from the positive straight line according to a pixel with the minimum vertical coordinate value in the vertical direction in the target positive boundary pixels.

6. The method according to claim 4, wherein the step of carrying out Hough transformation on the pixels in the positive narrowed boundary pixel groups to obtain a positive straight line for representing the boundary trend of the to-be-identified object comprises:

eliminating invalid groups from the positive narrowed boundary pixel groups, wherein a regional position distance between a regional position of the invalid groups and an average regional position of other groups is greater than a preset distance threshold; and carrying out Hough transformation on the pixels in the positive narrowed boundary pixel groups after the invalid groups are eliminated to obtain the positive straight line for representing the boundary trend of the to-be-identified object.

7. A non-transitory computer readable storage medium, stored with a computer program, wherein steps of the method according to claim 1 are implemented when the computer program is executed by a processor.

8. A device for identifying a traffic cone on a basis of an image of a to-be-identified object, the device comprising:

an image acquiring module, used for acquiring the image of the to-be-identified object in a driving process of a vehicle;

a boundary detecting module, used for carrying out differential processing on the image to obtain an image subjected to differential processing, and carrying out ternary processing on the image subjected to differential processing according to a preset threshold to obtain a ternary image comprising positive boundary pixels and negative boundary pixels;

an analyzing module, used for acquiring a positive straight line segment and a negative straight line segment which represent a boundary trend of the to-be-identified object according to the positive boundary pixels and the negative boundary pixels; and a determination module, used for determining the to-be-identified object as a traffic cone when position information between the positive straight line segment and the negative straight line segment is matched with known boundary position information of the traffic cone.

9. The device according to claim 8, wherein the determination module is used for:

respectively determining a first inclination angle of the positive straight line segment, a second inclination angle of the negative straight line segment, a first distance between a first end point of the positive straight line segment and a first end point of the negative straight line segment and a second distance between a second end point of the positive straight line segment and a second end point of the negative straight line segment, wherein the first end point of the positive straight line segment corresponds to the first end point of the negative straight line segment in a horizontal direction, and the second end point of the positive straight line segment corresponds to the second end point of the negative straight line segment in the horizontal direction; and determining the to-be-identified object as the traffic cone when the first inclination angle is matched with a first preset inclination angle, the second inclination angle is matched with a second preset inclination angle, the first distance is matched with a first preset distance and the second distance is matched with a second preset distance, wherein the known boundary position information of the traffic cone comprises the first preset inclination angle, the second preset inclination angle, the first preset distance and the second preset distance.

10. The device according to claim 8, wherein the analyzing module comprises:

a grouping submodule, used for respectively grouping the positive boundary pixels and the negative boundary pixels to obtain positive boundary pixel groups and negative boundary pixel groups respectively, wherein the positive boundary pixels or the negative boundary pixels are respectively interconnected with other boundary pixels in respective groups in all directions;

a pixel narrowing submodule, used for carrying out boundary pixel narrowing on the positive boundary pixel groups and the negative boundary pixel groups respectively in a horizontal direction to obtain positive narrowed boundary pixel groups and negative narrowed boundary pixel groups respectively, wherein a total number of boundary pixels of each of the positive narrowed boundary pixel groups and the negative narrowed boundary pixel groups in the horizontal direction does not exceed a preset threshold; and a boundary optimizing submodule, used for carrying out Hough transformation on the pixels in the positive narrowed boundary pixel groups and the pixels in the negative narrowed boundary pixel groups respectively to obtain the positive straight line segment and the negative straight line segment.

11. The device according to claim 10, wherein the boundary optimizing submodule is used for:

respectively carrying out Hough transformation on the pixels in the positive narrowed boundary pixel groups and the pixels in the negative narrowed boundary pixel groups to obtain a positive straight line and a negative straight line which represent the boundary trend of the to-be-identified object;

matching the positive boundary pixels with the positive straight line to determine two end points from the positive straight line, wherein a segment between the two end points is the positive straight line segment; and matching the negative boundary pixels with the negative straight line to determine two end points from the negative straight line, wherein a segment between the two end points from the negative straight line is the negative straight line segment.

12. The device according to claim 11, wherein the boundary optimizing submodule is used for:

determining target positive boundary pixels from the positive boundary pixels, wherein a distance from the target positive boundary pixels to the positive straight line is smaller than a preset distance; and determining a first end point in the two end points from the positive straight line according to a pixel with the maximum vertical coordinate value in a vertical direction in the target positive boundary pixels, and determining a second end point in the two end points from the positive straight line according to a pixel with the minimum vertical coordinate value in the vertical direction in the target positive boundary pixels.

13. The device according to claim 11, wherein the boundary optimizing submodule is used for:

eliminating invalid groups from the positive narrowed boundary pixel groups, wherein a regional position distance between a regional position of the invalid groups and an average regional position of other groups is greater than a preset distance threshold; and carrying out Hough transformation on the pixels in the positive narrowed boundary pixel groups after the invalid groups are eliminated to obtain the positive straight line for representing the boundary trend of the to-be-identified object.

* * * * *